(12) United States Patent  
Gu

(10) Patent No.: US 7,986,329 B2  
(45) Date of Patent: Jul. 26, 2011

(54) DOCUMENT EDIT DEVICE, PROGRAM, AND STORAGE MEDIUM

(75) Inventor: Yu Gu, Fuchu (JP)

(73) Assignee: Seiko Epson Corporation (JP)

( * ) Notice: Subject to any disclaimer, the term of this patent is extended or adjusted under 35 U.S.C. 154(b) by 971 days.

(21) Appl. No.: 11/904,586

(22) Filed: Sep. 27, 2007

(65) Prior Publication Data

US 2008/0291503 A1    Nov. 27, 2008

(30) Foreign Application Priority Data

Sep. 28, 2006    (JP) .................................. 2006-265437

(51) Int. Cl.  
*G09G 5/02*    (2006.01)

(52) U.S. Cl. ......... 345/589; 345/590; 345/593; 358/1.9; 358/452

(58) Field of Classification Search .................. None  
See application file for complete search history.

(56) References Cited

U.S. PATENT DOCUMENTS

| | | | | |
|---|---|---|---|---|
| 5,611,030 A | * | 3/1997 | Stokes ........................... | 345/590 |
| 2005/0068331 A1 | * | 3/2005 | Sekiguchi et al. ............ | 345/589 |
| 2006/0197848 A1 | | 9/2006 | Ogawa | |
| 2007/0146754 A1 | * | 6/2007 | Chang ............................ | 358/1.9 |
| 2007/0242289 A1 | * | 10/2007 | Ramanath ...................... | 358/1.9 |

FOREIGN PATENT DOCUMENTS

| | | |
|---|---|---|
| JP | 2006-092184 | 4/2006 |
| JP | 2006-237861 | 9/2006 |

OTHER PUBLICATIONS

Hiroki Imahashi, et al., "Image Generation by Color Support System, 'AYA'", Visual Computing Graphics and CAD Symposium 2003, Institute of image Electronics Engineers of Japan, Jun. 19, 2003.

* cited by examiner

*Primary Examiner* — Ulka Chauhan  
*Assistant Examiner* — Donna J Ricks  
(74) *Attorney, Agent, or Firm* — Harness, Dickey & Pierce, P.L.C.

(57) ABSTRACT

A document edit device includes: a memory configured to store a plurality of data sets, each of which includes identifiers of at least two colors; a color information obtaining unit configured to obtain color information indicating at least one reference color as a color of an element among elements included in a document as an edit target; an extraction unit configured to extract a data set including an identifier of an approximate color, from among the data sets stored in the memory, the approximate color being a color having the shortest color distance to the at least one reference color indicated by the color information obtained by the color information obtaining unit; and a first color determination unit configured to determine a color of an other element included in the document, based on at least one of a color difference vector between two colors included in the data set extracted by the extraction unit and a color difference vector between the approximate color and the reference color.

7 Claims, 9 Drawing Sheets

| | L* | a* | b* |
|---|---|---|---|
| BACKGROUND COLOR 1 | 62.3 | 55 | 71.3 |
| COLOR A (APPROXIMATE COLOR) | 55.7 | 73 | 68.1 |
| COLOR DIFFERENCE (= BACKGROUND COLOR 1 − COLOR A) | 6.6 | -18 | 3.2 |
| $\Delta E_{Lab}$ (NOTE) | 19.4 | | |
| COLOR B (TARGET COLOR) | 97.1 | -21.6 | 94.5 |
| TEXT COLOR | 100 | -39.5 | 97.7 |

(NOTE) $\Delta E_{Lbb}=\mathrm{sqrt}((L1-L2)*(L1-L2)+(a1-b2)*(a1-b2)+(b1-b2)*(b1-b2))$

|  | L* | a* | b* |
|---|---|---|---|
| BACKGROUND COLOR 2 | 47.5 | 61.2 | 8.1 |
| COLOR A (APPROXIMATE COLOR) | 55.7 | 73 | 68.1 |
| COLOR DIFFERENCE (= BACKGROUND COLOR 2 - COLOR A) | -8.2 | -11.8 | -60 |
| $\Delta E_{Lab}$ | 61.8 | | |
| COLOR B (TARGET COLOR) | 97.1 | -21.6 | 94.5 |
| TEXT COLOR | 89 | -33.3 | 34.4 |

|  | L* | a* | b* |
|---|---|---|---|
| $S_1$ | 62 | 55 | 71 |
| $S_2$ | 47 | 62 | 8 |
| $D_{k1}$ | 72 | 30 | 77 |
| $D_{k2}$ | 31 | 55 | 45 |
| P | 28 | 33 | -56 |
| $V_1(=S_1-D_{k1})$ | -10 | 25 | -6 |
| $V_2(=S_2-D_{k2})$ | 16 | 8 | -38 |
| EQUALLY SIGNED | No | Yes | Yes |
| AN AVERAGE VALUE OF COLOR COMPONENT DIFFERENCES | 0 | 16 | -22 |
| CORRECTED P | 28 | 49 | -77 |

FIG. 15

|  | L* | a* | b* |
|---|---|---|---|
| $S_1$ | 62 | 55 | 71 |
| $S_2$ | 47 | 62 | 8 |
| $D_{k1}$ | 72 | 30 | 77 |
| $D_{k2}$ | 31 | 55 | 45 |
| P | 28 | 33 | -56 |
| $V_1(=S_1-D_{k1})$ | -10 | 25 | -6 |
| $V_2(=S_2-D_{k2})$ | 16 | 8 | -38 |
| EQUALLY SIGNED | No | Yes | Yes |
| AN AVERAGE VALUE OF COLOR COMPONENT DIFFERENCES | 0 | 16 | -22 |
| CORRECTED P | 28 | 33 | -77 | though
DOCUMENT EDIT DEVICE, PROGRAM, AND STORAGE MEDIUM

The entire disclosures of Japanese Patent Application No. 2006-265437 filed on Sep. 28, 2006 is expressly incorporated by reference herein.

BACKGROUND

1. Technical Field

The present invention relates to a technique for editing a document.

2. Related Art

As personal computers and color printers become increasingly popular, users may easily edit or create documents which are presented in multiple colors. However, it is difficult for people having no expertise to choose a combination of colors which readers perceive as beautiful. A technique described in JP-A-2006-092184 is known as a technique for use by such people for performing automatic coloration. JP-A-2006-092184 discloses plural coloration tables storing coloration patterns. From the plural coloration tables, a coloration table including a color which has the smallest color difference to a representative color of a colored object is selected.

SUMMARY

However, according to JP-A-2006-092184, results of coloration are limited to those stored in coloration tables. That is, according to JP-A-2006-092184, colors of objects other than colored objects are assigned to colors stored in a selected coloration table. Therefore, colors of objects other than colored objects are always the same as those stored in coloration tables, while colors of colored objects are not always the same as those stored in the coloration table. This means that relationships between plural colors stored in a coloration table are not properly reproduced.

In contrast, the present invention provides a technique capable of properly reproducing relationships between pre-stored plural colors when determining coloration.

To address the problem, according to one aspect of the invention, there is provided a document edit device including: a memory that stores a plurality of data sets each including identifiers of at least two colors; a color information obtaining unit that obtains color information indicating at least one reference color as a color of an element among elements included in a document as an edit target; an extraction unit that extracts a data set including an identifier of an approximate color, from among the data sets stored in the memory, the approximate color being a color having the shortest color distance to the at least one reference color indicated by the color information obtained by the color information obtaining unit; and a first color determination unit that determines a color of an other element included in the document, based on at least one of a color difference vector between two colors included in the data set extracted by the extraction unit and a color difference vector between the approximate color and the reference color.

According to this document edit device, a color of an other element may be determined so that a relationship between at least two colors included in a data set stored in the memory is properly reproduced.

It is preferable that the document edit device may be configured so that the first color determination unit determines the color of the other element so that a color difference vector between the color of the other element and the reference color is equal to the color difference vector between the two colors included in the data set extracted by the extraction unit.

It is preferable that the document edit device may be configured so that the first color determination unit determines the color of the other element by adding the color difference vector between the approximate color and the reference color to a color other than the approximate color among the colors included in the data set extracted by the extraction unit.

It is preferable that the document edit device may be configured so as to further include: a judgement unit that determines whether a color distance between the color indicated by the color information obtained by the color information obtaining unit and the approximate color is equal to or smaller than a threshold or not; and a second color determination unit that determines a color, which belongs to the same data set as the approximate color, as the color of the other element if the color distance between the reference color and the approximate color is determined to be equal to or smaller than the threshold.

It is preferable that the document edit device may be configured so that each of the data sets stored in the memory includes m colors (where m is an integer which satisfies m≧3), the color information obtaining unit obtains n elements from among the elements included in the document, the extraction unit extracts a data set including identifiers of n approximate colors respectively corresponding to colors indicated by the color information of the n elements obtained by the color information obtaining unit, from among the data sets stored in the memory, and the first color determination unit determines the color of the other element, based on an average vector having, as a component, an average of color component values of n color difference vectors between the colors of the n elements and the n approximate colors.

It is preferable that the document edit device may be configured so that the first color determination unit determines the color of the other element, based on the average vector, and if the color component values of the n color difference vectors between the n elements and the n approximate colors are all given equal signs, the component of the average vector is the average of the color component values of the n color difference vectors, or if the color component values of the n color difference vectors are not all given equal signs, the component of the average vector is zero.

According to another aspect of the invention, there is provided a program causing a computer device, which includes memory storing a plurality of data sets each including identifiers of at least two colors, to execute; a color information obtaining step that obtains color information indicating at least one reference color as a color of an element among elements included in a document as an edit target; an extraction step that extracts a data set including an identifier of an approximate color, from among the data sets stored in the memory, the approximate color being a color having the shortest color distance to the at least one reference color indicated by the color information obtained by the color information obtaining step; and a first color determination step that determines a color of an other element included in the document, based on at least one of a color difference vector between two colors included in the data set extracted by the extraction step and a color difference vector between the approximate color and the reference color.

According to yet another aspect of the invention, there is provided a storage medium storing the program.

BRIEF DESCRIPTION OF THE DRAWING

The invention will be described with reference to the accompanying drawings, wherein like numbers refer to like units:

FIG. 15 is a table showing an example of a process according to the fourth embodiment.

DESCRIPTION OF EXEMPLARY EMBODIMENTS

1. First Embodiment

Figure 1:
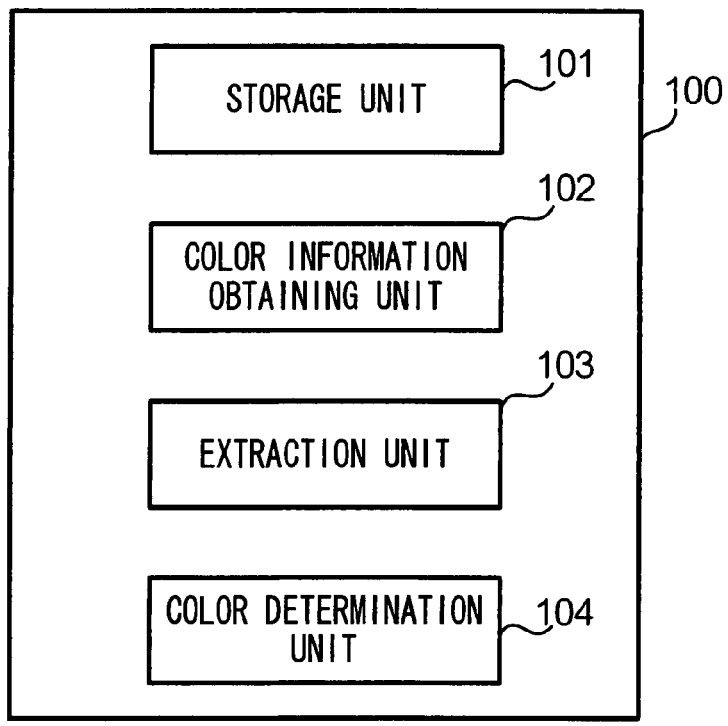
FIG. 1 is a block diagram showing a functional structure of a document edit device 100 according to the first embodiment.

FIG. 1 is a block diagram showing a functional structure of a document edit device 100 according to the first embodiment of the invention. The document edit device 100 has a function by which a color of an element other than an element whose color has already been determined among elements included in a document as an edit target to be edited is determined on the basis of the color already determined. A "document" refers to data including data which includes at least one object and layout information, or refers to a result which is generated based on the data. An "object" refers to data including a text (character string) or image. An "element" in a document refers to attribute information indicating an object, layout information, or an attribute of an object or document. "Attribute information" includes, for example, a background color, text color, document identifier, identifier of an object, and the like.

A storage unit 101 stores a coloration table TB1. The coloration table TB1 is a table which stores plural coloration patterns (data sets). Each coloration pattern includes at least two color identifiers. Particularly in this embodiment, each coloration pattern includes two color identifiers. Each coloration pattern is obtained on the basis of knowledge of experts such as designers. Each coloration pattern includes a beautiful combination of colors. Each coloration pattern may include information specifying a target such as a "text" and "background" to which colors are applied, or may simply include identifiers indicating colors.

A color information obtaining unit 102 obtains color information concerning a reference color (or reference colors). A "reference color" refers to a color of at least one element (hereinafter "reference element") which is taken as a reference when determining a coloration pattern, among elements included in a document as an edit target. The reference element may be determined in advance. Otherwise, the reference element may be determined based on an instruction from a user. "Color information" refers to information specifying a color. The color information includes, for example, values of respective color components according to the L*a*b* color coordinate system. It is to be noted that color coordinate systems used for the color information are not limited to the L*a*b* color coordinate system. Other color coordinate systems such as an RGB color coordinate system and CMYK color coordinate system may be used.

An extraction unit 103 extracts a coloration pattern including an approximate color. An "approximate color" refers to a color having the shortest color distance to a reference color among colors included in a coloration pattern. If a coloration pattern includes information such as a "text" or "background" specifying a target to which colors of the coloration pattern should be applied, an approximate color may be selected from among colors which should be applied to the same target as a reference element.

Based on color difference vectors of colors included in an extracted coloration pattern, a color determination unit 104 determines a color of an other element included in a document as an edit target. A "color difference vector" refers to a vector which has, as its components, differences in value respectively for the color components of the L*a*b* coordinate system.

Figure 2:
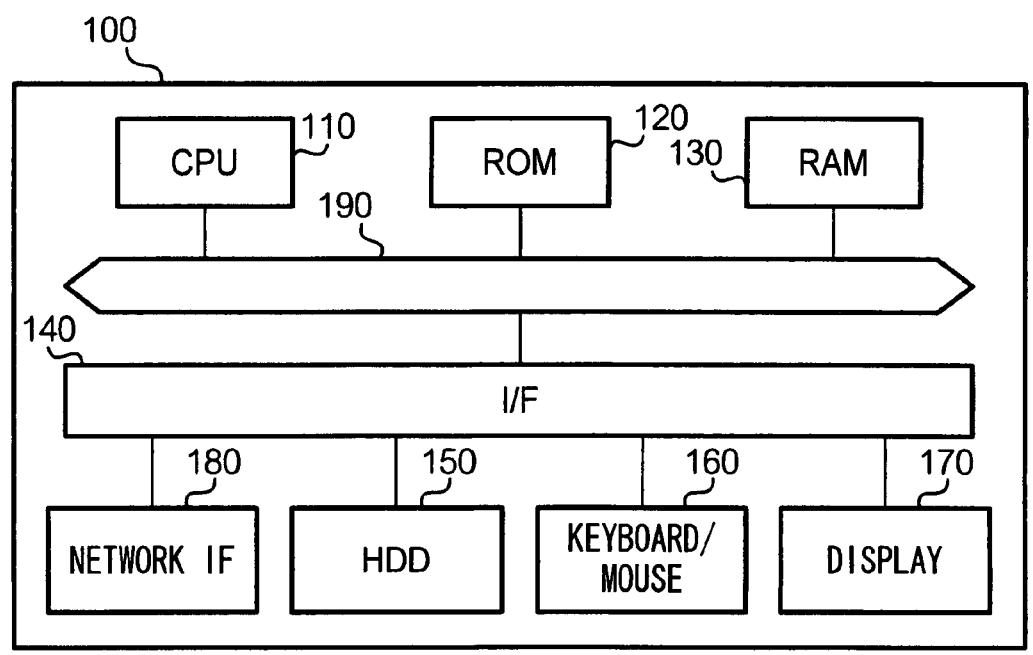
FIG. 2 is a block diagram showing a hardware structure of the document edit device 100.

FIG. 2 is a block diagram showing a hardware structure of the document edit device 100. The CPU 110 (Central Processing Unit) 110 is a control device which controls constitutional elements of the document edit device 100. A ROM (Read Only Memory) 120 is a storage device which stores data and programs required for starting up the document edit device 100. A RAM (Random Access Memory) 130 is a storage device which functions as a work area when the CPU 110 executes programs. Through an I/F (Interface) 140, data and control signals are input/output from/to various input/output devices and storage devices. A HDD (Hard Disk Drive) 150 is a storage device which stores various programs and data. As far as this embodiment is concerned, the HDD 150 stores a document edit program for determining color of an element included in a document. The HDD 150 also stores a coloration table TB1. A keyboard/mouse 160 is an input device via which a user inputs instructions to the document edit device 100. A display 170 is an output device which displays content of data or processing status. In this embodiment, the display 170 displays objects, layout areas, and grid lines. A network IF 180 is an interface which transmits/receives data to/from other devices connected through a network (not shown). The document edit device 100 is capable of, for example, receiving a document (more exactly, electronic data expressing a document) through the network and the network IF 180. The CPU 110, ROM 120, RAM 130, and I/F 140 are connected via a bus 190. As the CPU 110 executes a document edit program, the document edit device 100 establishes the functional structure as shown in FIG. 1. The document edit device 100 may be of any type as long as the document edit device 100 has the functional structure shown in FIG. 1 as well as the hardware structure shown in FIG. 2. For example, the document edit device 100 may be a so-called personal computer. Alternatively, the document edit device 100 may be an image forming device such as a printer which has those functions.

Figures 3, 4:
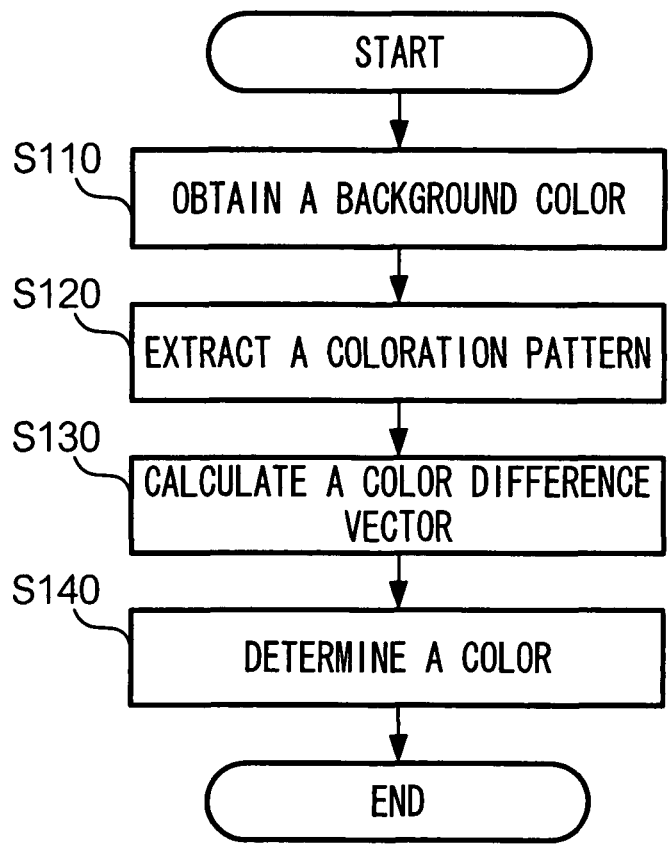
FIG. 3 is a flowchart showing a document edit process according to the first embodiment.
FIG. 4 is a table showing an example of a process according to the first embodiment.

FIG. 3 is a flowchart showing a document edit process according to the first embodiment. The following description will be made of an example in which a background of a document is used as a reference element, as well as a text color as another element. In a step S110, the CPU 110 obtains a reference color, i.e., color information of a background color. The color information may be obtained from inside the document edit device 100 such as the HDD 150 or from another device through a network IF 180 or the like. Otherwise, the color information may be obtained together with other information such as an object or document, or may be obtained as a part of any other information.

In a step S120, the CPU 110 extracts a coloration pattern including an approximate color from the coloration table TB1. Hereinafter, the coloration pattern including the approximate color will be referred to as a "target pattern". In a step S130, the CPU 110 calculates a color difference vector between a reference color and the approximate color. The color difference vector refers to a vector expressing a difference between vectors expressing two colors in a case where colors are expressed as vectors on the color coordinate system.

In a step S140, the CPU 110 determines a text color on the basis of color difference vectors. More specifically, the text color is determined so that a color difference vector between the background color and the text color is equal to a color difference vector between an approximate color and a target color. The "target color" refers to a color other than the approximate color among colors included in the target pattern. That is, the CPU 110 is capable of determining the text color through any of the processes described below.

(1) A process for determining a text color by adding a color difference vector between background and approximate colors to a target color: in this case, the process in the step S140 may be differently considered to be a process which determines a text color by correcting the target color on the basis of a color difference vector.

(2) A process for determining a text color by adding a color difference vector between approximate and target colors to a background color Basically, equal results are obtained through both of the processes (1) and (2).

FIG. 4 shows an example of a process according to the first embodiment. According to this example, the CPU 110 obtains first a color (L*, a*, b*)=(62.3, 55, 71.3). Next, the CPU 110 extracts a coloration pattern including (L*, a*, b*)=(55.7, 73, 68.1) as an approximate color (color A) from the coloration table TB1. This coloration pattern includes colors A and B. The color B is (L*, a*, b*)=(97.1, −21.6, 94.5). Next, the CPU 110 calculates a color difference vector between the background color and the color A. In this example, the color difference vector is calculated to be (ΔL*, Δa*, Δb*)=(6.6, −18, 3.2). The CPU 110 may also calculate an absolute value (or size) $\Delta E_{Lab}$ of the color difference vector. The $\Delta E_{Lab}$ is calculated from an expression (1) below.

$$\Delta E_{Lab} = \sqrt{(\Delta L^*)^2 + (\Delta a^*)^2 + (\Delta b^*)^2} \quad (1)$$

Next, the CPU 110 determines the text color by adding the color difference vector to the vector of the color B. In the example of FIG. 4, the calculated text color is (L*, a*, b*)= (100, −39.5, 97.7). For convenience, this color will be referred to as color C. A maximum value (e.g., 100) and a minimum value (e.g., −100) are determined in advance as defining a range of values of each color component. If this range is exceeded by a result of the addition as described above, the value of each related color component is determined to be the maximum or minimum value.

Figures 5, 6:
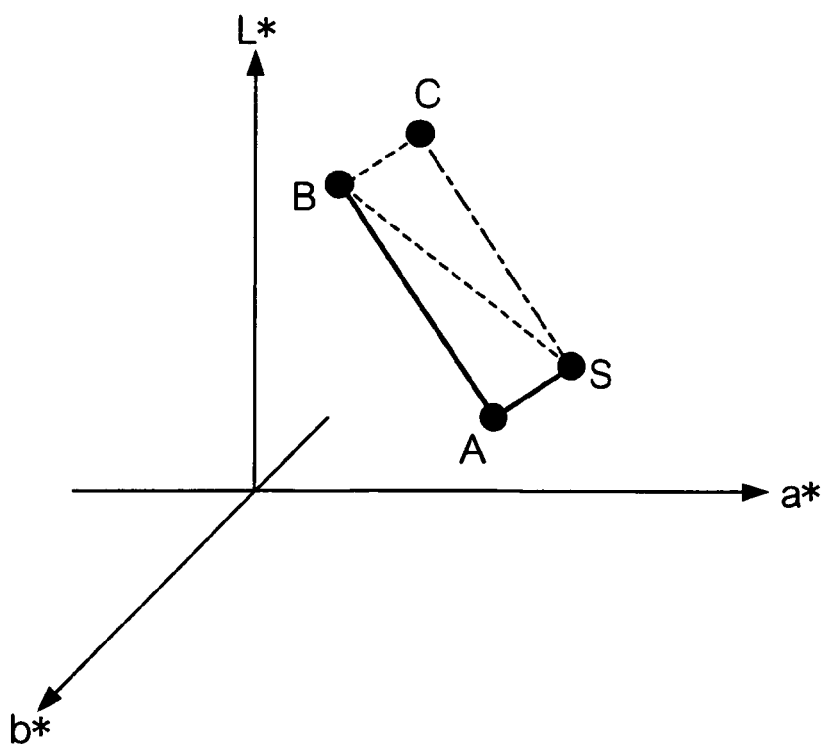
FIG. 5 is a table showing another example of a process according to the first embodiment.
FIG. 6 is a view comparing the first embodiment with an example of a related art.

FIG. 5 shows another example of a process according to the first embodiment. According to this example, the CPU 110 obtains first a color (L*, a*, b*)=(47.5, 61.2, 8.1). Next, the CPU 110 extracts a coloration pattern including the color A as an approximate color from the coloration table TB1. This coloration pattern includes colors A and B. Next, the CPU 110 calculates a color difference vector between the background color and the color A. In this example, the color difference vector is calculated to be (ΔL*, Δa*, Δb*)=(−8.2, −11.8, −60). The CPU 110 may also calculate an absolute value $\Delta E_{Lab}$ of the color difference vector. The $\Delta E_{Lab}$ is calculated to be $\Delta E_{Lab}$=61.8 from the expression (1). The CPU 110 further determines the text color by adding the color difference vector to the vector of the color B. In the example of FIG. 5, the calculated text color is (L*, a*, b*)=(89, −33.3, 34.4).

As has been described above, a color of an other element is determined while a relationship is maintained between two colors included in a coloration pattern stored in the coloration table TB1, according to this embodiment. Accordingly, the intentions of creators of color patterns are properly reproduced.

FIG. 6 compares the first embodiment with an example of a related art. A color S is a reference color. A color A is an approximate color of the color S. This coloration pattern includes colors A and B. According to the technique of the prior art, the text color is determined to be a color B. At this time, a relationship between the colors S and B, i.e., a color difference vector between the colors S and B is different from that intended by a creator of a coloration pattern (a color difference vector between the colors A and B). However, according to this embodiment, the text color is determined to be a color C which is obtained by adding the color difference vector between the colors S and B to the color B. At this time, the relationship between the colors S and C, i.e., the color difference vector between the colors S and C matches that intended by the creator of the coloration pattern (the color difference vector between the colors A and B).

2. Second Embodiment

Next, the second embodiment of the invention will be described. From the following description, description of common features to the first embodiment will be omitted. Common constitutional elements to the first embodiment will be described, denoted by common reference symbols.

Figure 7:
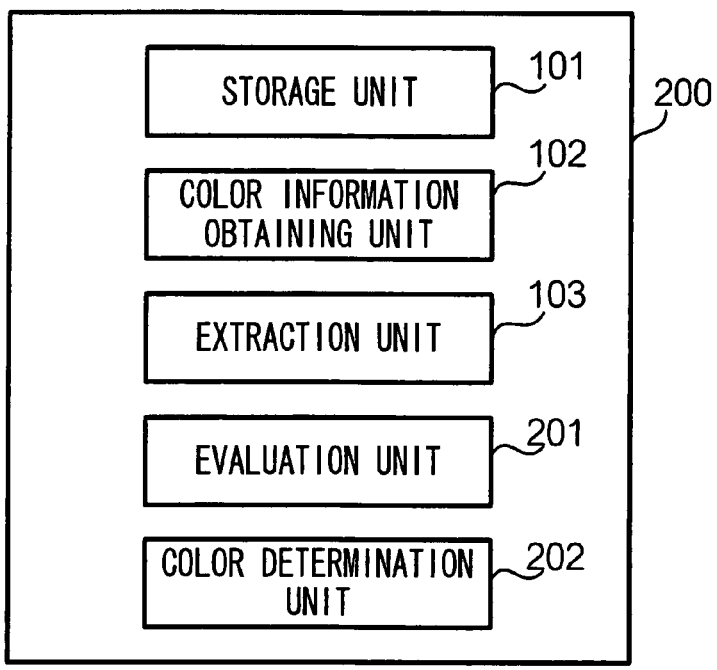
FIG. 7 is a block diagram showing a functional structure of a document edit device 200 according to the second embodiment.

FIG. 7 is a block diagram showing a functional structure of a document edit device 200 according to the second embodiment. The document edit device 200 differs from the document edit device 100 in that the device 200 has an evaluation unit 201 and a color determination unit 202. The evaluation unit 201 evaluates a color distance or, in other words, the absolute value of a color difference vector between a reference color and an approximate color. Hereinafter, the absolute value of a color difference vector will be simply referred to as a "color difference". Specifically, the evaluation unit 201 determines whether the color distance between a reference color and an approximate color is equal to or smaller than (or simply smaller than) a threshold or not. The color determination unit 202 has a function of determining a color included in a coloration pattern, as a color of an other element, in addition to functions of the color determination unit 104. A method for determining a color of an other element is determined based on a determination result by the evaluation unit 201. Note that the document edit device 200 has the same hardware structure as that of the first embodiment. The following description will be made of an example in which a background of a document is used as a reference element as well as a text color of a text as an other element, similarly to that of the first embodiment.

Figure 8:
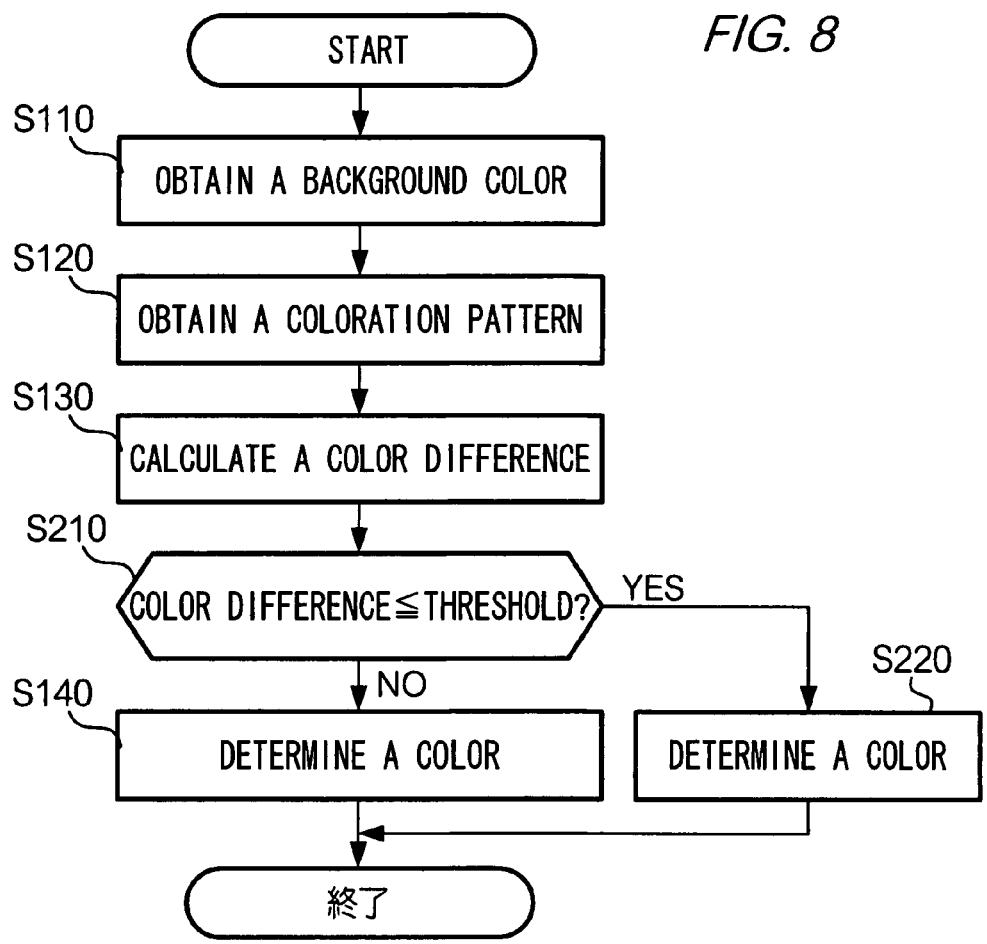
FIG. 8 is a flowchart showing a document edit process according to the second embodiment.

FIG. 8 is a flowchart showing a document edit process according to the second embodiment. The process of steps S110 to S130 is carried out in the same manner as in the first embodiment. In a step S210, the CPU 110 determines whether a color difference is equal to or smaller than a threshold or not. The threshold is stored in advance in the HDD 150. Alternatively, the threshold may be determined based on an instruction from a user. If the color difference is determined to be equal to or smaller than the threshold (S210: YES), the CPU 110 proceeds the process to a step S220. If the color difference is not determined to be equal to or smaller than the threshold (S210: NO), the CPU 110 proceeds the process to the step S140. The process in the step S140 is carried out in the same manner as in the first embodiment.

In the step S220, the CPU 110 determines that a target color is a text color. The process of the step S220 may be differently considered as a process which does not carry out correction of a target color insofar as the color difference is equal to or smaller than a threshold.

For example, an exemplary case of a threshold Th=30 will now be described. In the example shown in FIG. 4, the color difference $\Delta E_{Lab}$=19.4 is given. In this example, $\Delta E_{Lab}$ satisfies $\Delta E_{Lab} \leq Th$, and accordingly, the target color is determined to be the text color. In contrast, in the example shown in FIG. 5, the color difference $\Delta E_{Lab}$=61.8 is given. In this example, $\Delta E_{Lab}$ does not satisfy $\Delta E_{Lab} \leq Th$, and consequently, the color C obtained by correcting the target color is determined to be the text color.

Thus, according to this embodiment, the process for determining a color of an other element is changed depending on the color difference. Accordingly, processing load is reduced.

3. Third Embodiment

Next, the third embodiment of the invention will be described. From the following description, description of common features to the first embodiment will be omitted. Common constitutional elements to the first embodiment will be described, denoted at common reference symbols. The first embodiment has been described with reference to an example in which each coloration pattern includes two colors. In the present embodiment, however, each coloration pattern includes m color identifiers (where m is an integer which satisfies $m \geq 3$). Also in the present embodiment, n reference colors are given (where n is an integer which satisfies n<m).

Figure 9:
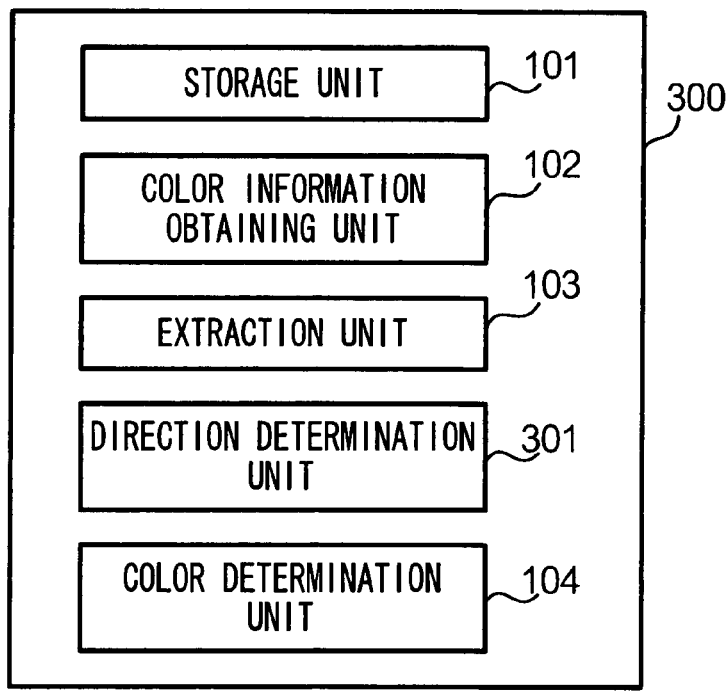
FIG. 9 is a block diagram showing a functional structure of a document edit device 300 according to the third embodiment.

FIG. 9 is a block diagram showing a functional structure of a document edit device 300 according to the third embodiment. The document edit device 300 differs from the document edit device 100 in that the device 300 has a direction determination unit 301. In this embodiment, there are n reference colors and n approximate colors. That is, n color difference vectors respectively exist between the reference colors and the approximate colors. When a target color is corrected, the text color is determined based on an average vector which is obtained by averaging the n color difference vectors. The direction determination unit 301 determines whether components of the n color difference vectors are signed equally or not, i.e., whether the components are directed in the same directions or not. Values of components of the average vector are determined based on a determination result from the direction determination unit 301.

Figure 10:
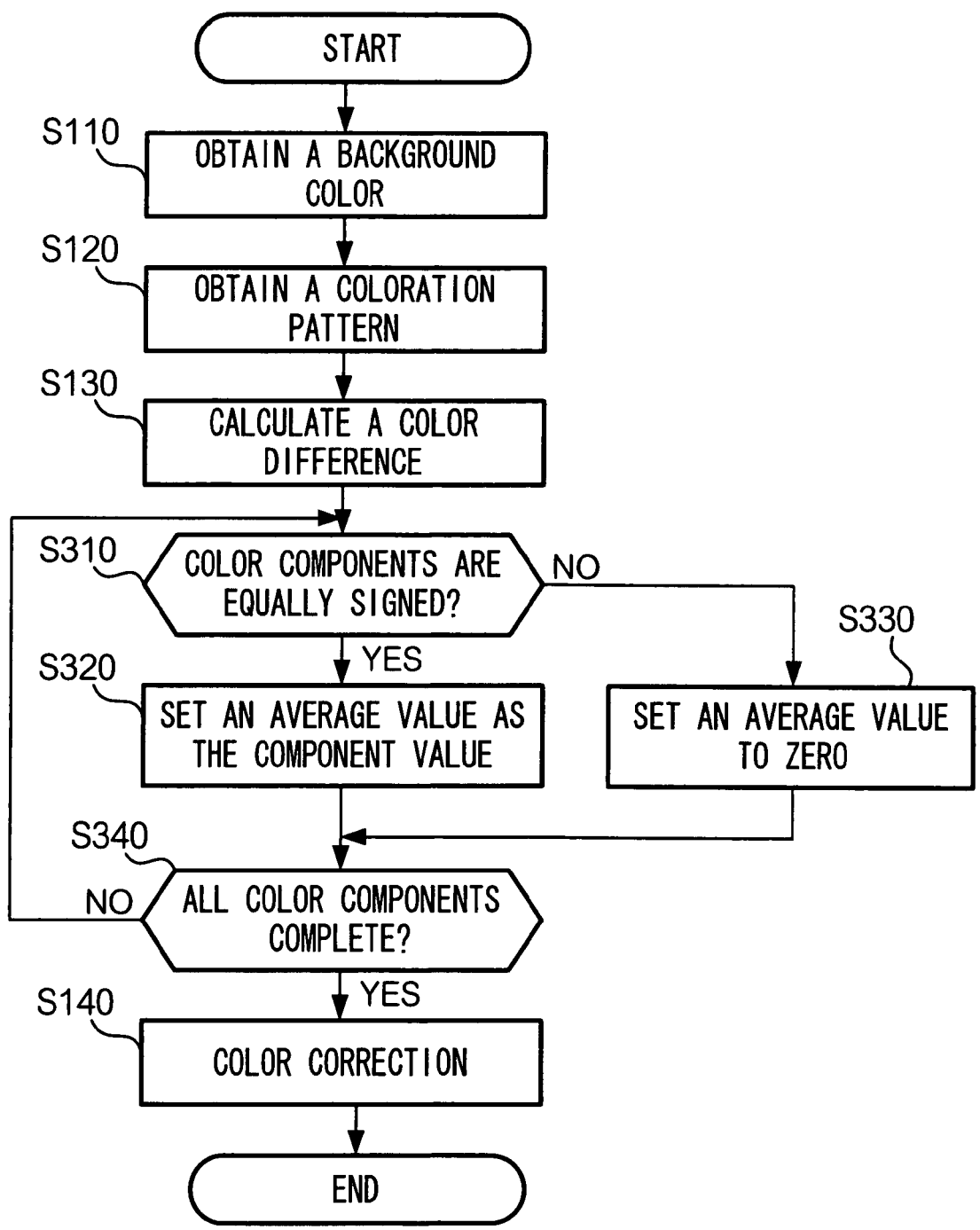
FIG. 10 is a flowchart showing a document edit process according to the third embodiment.

FIG. 10 is a flowchart showing a document edit process according to the third embodiment. The process of steps S110 to S130 is carried out in the same manner as in the first embodiment. However, since the number of colors included in a coloration pattern is different from that of the first embodiment, the process of steps S110 to S130 will be described again. In this embodiment, there are n background colors. In the step S120, the CPU 110 extracts a coloration pattern including approximate colors. Since n background colors exist, n approximate colors exist. The n background colors one-to-one-correspond to the n approximate colors. The n approximate colors are respectively expressed as $D_{K1}$, $D_{K2}, \ldots, D_{Kn}$. The target pattern includes a color P in addition to n colors of $D_{K1}, D_{K2}, \ldots, D_{Kn}$. Specifically, the color P represents a target color. In the step S130, the CPU 110 calculates color difference vectors between the background colors and approximate colors. There are n color difference vectors as well. Each of the n color difference vectors corresponds to one of the n background colors and one of the n approximate colors.

In a step S310, the CPU 110 determines whether color difference components are equally signed or not. Details of the determination will now be described below. The CPU 110 specifies first one color component as a processing target among L*, a*, and b*. For example, color components are specified one after another in the order of L*, a*, and b*. An example will now be described of a case of specifying L* as a color component to be processed as a processing target. The CPU 110 determines signs of L* components of all the n color difference vectors are equal to one another. If the signs of L* components of n color difference vectors are determined to be all equal (S310: YES), the CPU 110 proceeds the process to the step S330. If the signs of L* components of n color difference vectors are not determined to be all equal (S310: NO), the CPU 110 proceeds the process to a step S330.

In the step S320, the CPU 110 takes an average value of n L* components as the L* component of the average vector. In a step S330, the CPU 110 takes zero as the value of the L* component of the average vector. If the value of a component of the average vector is set to zero where signs are unequal, an unexpected color sometimes appears as a result of averaging values given such unequal signs. Consequently, the process is complicated.

In a step S340, the CPU 110 determines whether the process is complete for all color components or not. If it is determined that there still is any color component for which the process is not yet complete (S340: NO), the CPU 110 proceeds the process again to the step S310. In the step S310, the color component a* is specified next as a processing target, and the process as described above is carried out repeatedly. If the process as described above is determined to be complete for all color components (S340: YES), the CPU 110 proceeds the process to the step S140.

The process in the step S140 is carried out in the same manner as in the first embodiment. However, an average vector of n color difference vectors is used instead of one single color difference vector. That is, the CPU 110 adds the average vector to the color P to determine a text color.

Figures 11, 12:
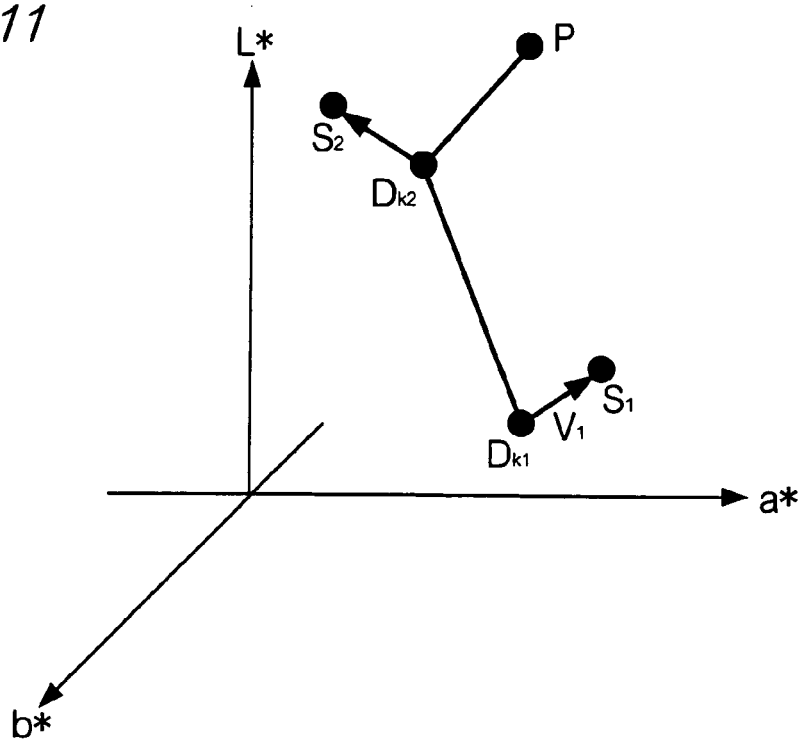
FIG. 11 is a diagram depicting color correction according to the third embodiment.
FIG. 12 is a table showing an example of a process according to the third embodiment.

FIG. 11 depicts color correction according to the third embodiment. FIG. 11 shows an example where m=3 and n=2 are given. A vector $V_1$ is a color difference vector between a reference color $S_1$ and an approximate color $D_{K1}$. A vector $V_2$ is a color difference vector between a reference color $S_2$ and an approximate color $D_{K2}$. When considering the component L*, the components L* of the vector $V_1$ and $V_2$ are given equal signs. Therefore, the component L* of the average vector is an average value between the components L* of the vectors $V_1$ and $V_2$. When considering the component a* on the other hand, the component a* of the vectors $V_1$ is oriented in a positive direction while that of the vector $V_2$ is oriented in a negative direction. That is, the components a* of the vectors $V_1$ and $V_2$ are unequal. Accordingly, the component a* of the average vector is zero.

FIG. 12 shows an example of a process according to the third embodiment. The reference color $S_1$ is (L*, a*, b*)=(62, 55, 71). The reference color $S_2$ is (L*, a*, b*)=(47, 62, 8). The approximate color $D_{K1}$ is (L*, a*, b*)=(72, 30, 77). The approximate color $D_{K2}$ is (L*, a*, b*)=(31, 55, 45). The target color P is (L*, a*, b*)=(28, 33, −56). The color difference vector $v_1$ is (ΔL*, Δa*, Δb*)=(−10, 25, −6). The color difference vector $v_2$ is (ΔL*, Δa*, Δb*)=(16, 8, −38). The components a* are signed equally as well as the components b*. However, the components L* are not given equal signs. Accordingly, an average value is taken as a component of an average vector for each of the components a* and b*. The average vector is added to the color P so that a color of (L*, a*, b*)=(28, 49, −77) is set as the text color.

As has been described above, according to this embodiment, an appropriate color may be determined as a color of an other element even if a coloration pattern includes three or more colors and if two or more reference colors exist.

In the embodiment described above, the method for calculating values of components of an average vector is changed depending on whether components of n color difference vectors are signed equally or not. Alternatively, average values of components of n color difference vectors are taken as components of an average vector, regardless of whether the signs of n color difference vectors are equal or not.

4. Fourth Embodiment

Next, the fourth embodiment of the invention will be described. From the following description, description of common features to the first to third embodiments will be omitted. However, common constitutional elements to the first to third embodiments will be described below, denoted at common reference symbols. In this embodiment, each coloration pattern includes identifiers for m colors (where m is an integer which satisfies m≧3). In this embodiment, n reference colors are given (where n is an integer which satisfies n<m). In the present embodiment, the second embodiment is extended so as to cover a coloration pattern including m colors and n reference colors.

Figure 13:
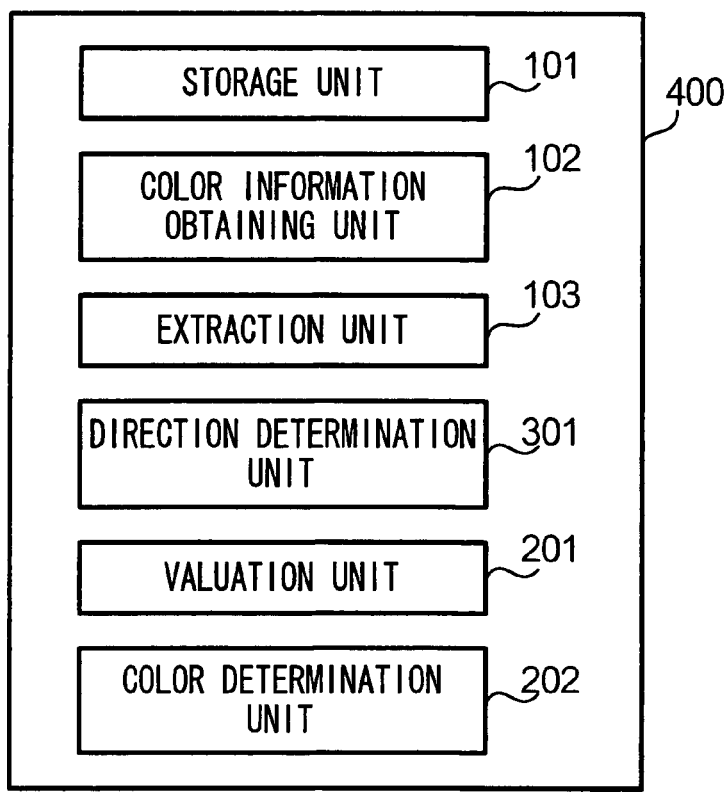
FIG. 13 is a block diagram showing a functional structure of a document edit device 400 according to the fourth embodiment.

FIG. 13 shows a functional diagram of a document edit device 400 according to the fourth embodiment. The document edit device 400 includes a direction determination unit 301, an evaluation unit 201, and a color determination unit 202, in addition to a storage unit 101, a color information obtaining unit 102, and an extraction unit 103. These functions are basically the same as those described in the first to third embodiments.

Figure 14:
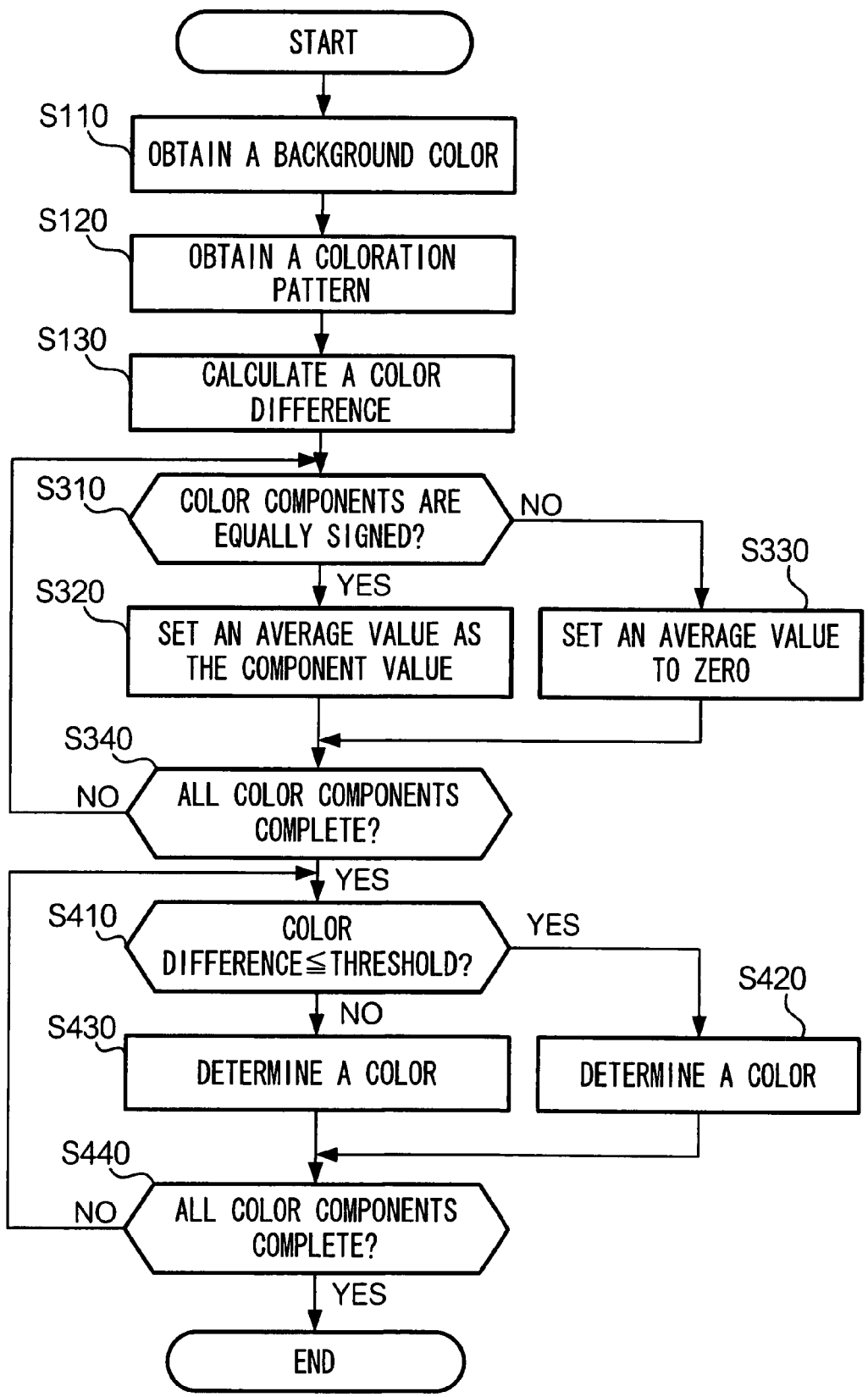
FIG. 14 is a flowchart showing a document edit process according to the fourth embodiment.

FIG. 14 is a flowchart showing a document edit process according to the fourth embodiment. The process of the steps S110 to 340 is carried out in the same manner as in the third embodiment. In a step S410, the CPU 110 determines whether each of values of components of an average vector is equal to or smaller than a threshold (or simply smaller than a threshold) or not. Details of the how the determination is made will now be described below. The CPU 110 specifies first one color component as a processing target among color components which are L*, a*, and b* in this case. For example, color components are specified one after another as a processing target, in the order of L*, a*, and b*. An example will now be described of a case of specifying L* as a color component to be processed as a processing target. The HDD 150 stores in advance thresholds for the color components, respectively. Otherwise, thresholds may be determined on the basis of an instruction from a user. If a value of a component as a processing target is determined to be equal to or smaller than a threshold (S410: YES), the CPU 110 proceeds the process to a step S420. If the value is not determined to be equal to or smaller than the threshold (S410: NO), the CPU 110 proceeds the process to a step S430.

In the step S420, the CPU 110 determines a text color as a target color. In the step S430, the CPU 110 determines the text color by adding an average vector to the target color. In a step S440, the CPU 110 determines whether the process is complete for all components or not. If it is determined there is any component for which the process as described above is not yet complete (S440: NO), the CPU 110 proceeds the process again to the step S410. In the step S410, the component a* is specified next as a processing target, and the process as described above is carried out repeatedly. If the process is determined to be complete for all components (S440: YES), the CPU 110 terminates the process shown in FIG. 14.

FIG. 15 shows an example of a process according to the fourth embodiment. The same reference colors $S_1$ and $S_2$, approximate colors $D_{K1}$ and $D_{K2}$, and target color P as those described in third embodiment are used. FIG. 15 shows an example where 20 is a threshold Th for absolute values of color components of an average vector. The component a* of the average vector has a value of "16". Since this value is not greater than the threshold Th, the component a* of the color P is taken directly as the component a* of the text color. The component b* of the average vector has a value of "−22". Since this value (an absolute value thereof) exceeds the threshold value Th, a value obtained by adding the component b* of the average vector to the component b* of the color P is taken as the component b* of the text color.

5. Further Embodiments

The invention is not limited to the embodiments described above but may be variously modified in practice.

Each of the above embodiments has been described with reference to an example in which a background of a document is used as a reference element as well as a text color of a text as an other element. However, the reference element and the other element are not limited to the background and the text, respectively. Any elements may be a reference element and an other element insofar as the elements are members constituting a document.

Each of the above embodiments uses only one other element. However, even plural other elements are applicable. In this case, for each of the plural other elements, the CPU 110 may execute the processes described in each of the above embodiments.

In the embodiments described above, the constitutional elements of the functional structures shown in FIGS. 1, 7, 9, and 13 are actually established as software as the CPU 110 executes programs. However, the document edit device 100 may actually implement electronic circuits equivalent to the constitutional elements of the functional structures shown in these figures. That is, the constitutional elements of the functional structures shown in these figures may be (partially) established as hardware.

In each of the above embodiments, the document edit program is stored in the HDD 150. However, the document edit program may be provided as a storage medium such as a CD-ROM (Compact Disk Read Only Memory).

What is claimed is:

1. A document edit device comprising:
   a memory configured to store a plurality of data sets, each of which includes identifiers of at least two colors;
   a color information obtaining unit configured to obtain color information indicating at least one reference color as a color of an element among elements included in a document as an edit target;
   an extraction unit configured to extract a data set including an identifier of an approximate color, from among the data sets stored in the memory, the approximate color being a color having the shortest color distance to the at least one reference color indicated by the color information obtained by the color information obtaining unit; and
   a first color determination unit configured to determine a color of another element included in the document, based on a color difference vector between two colors included in the data set extracted by the extraction unit.

2. The document edit device according to claim 1, wherein the first color determination unit is configured to determine the color of the other element so that a color difference vector between the color of the other element and the reference color is equal to the color difference vector between the two colors included in the data set extracted by the extraction unit.

3. The document edit device according to claim 1, wherein the first color determination unit is configured to determine the color of the other element by adding the color difference vector between the approximate color and the reference color to a color other than the approximate color among the colors included in the data set extracted by the extraction unit.

4. The document edit device according to claim 1, further comprising:
   a judgement unit that determines whether a color distance between the color indicated by the color information obtained by the color information obtaining unit and the approximate color is equal to or smaller than a threshold or not; and
   a second color determination unit that determines a color, which belongs to the same data set as the approximate color, as the color of the other element if the color distance between the reference color and the approximate color is determined to be equal to or smaller than the threshold.

5. The document edit device according to claim 1, wherein each of the data sets stored in the memory includes m colors (where m is an integer which satisfies m≧3),
   the color information obtaining unit is configured to obtain n elements from among the elements included in the document,
   the extraction unit is configured to extract a data set including identifiers of n approximate colors respectively corresponding to colors indicated by the color information of the n elements obtained by the color information obtaining unit, from among the data sets stored in the memory, and
   the first color determination unit is configured to determine the color of the other element, based on an average vector having, as a component, an average of color component values of n color difference vectors between the colors of the n elements and the n approximate colors.

6. The document edit device according to claim 5, wherein
   the first color determination unit is configured to determine the color of the other element, based on the average vector, and
   if the color component values of the n color difference vectors between the n elements and the n approximate colors are all given equal signs, the component of the average vector is the average of the color component values of the n color difference vectors, or if the color component values of the n color difference vectors are not all given equal signs, the component of the average vector is zero.

7. A computer-readable non-transitory storage medium storing a program causing a computer device, which includes a processor and a memory storing a plurality of data sets, each of which includes identifiers of at least two colors, to execute a process, the process comprising:
   obtaining, by the processor, color information indicating at least one reference color as a color of an element among elements included in a document as an edit target;
   extracting, by the processor, a data set including an identifier of an approximate color, from among the data sets stored in the memory, the approximate color being a color having the shortest color distance to the at least one reference color indicated by the obtained color information; and
   determining, by the processor, a color of another element included in the document, based on at least one of a color difference vector between two colors included in the data set extracted by the extraction step.

* * * * *